United States Patent
Xu

(10) Patent No.: US 12,389,110 B2
(45) Date of Patent: Aug. 12, 2025

(54) PROCESS CONTROL METHOD, ELECTRONIC DEVICE, AND READABLE STORAGE MEDIUM

(71) Applicant: HONOR DEVICE CO., LTD., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/262,328

(22) PCT Filed: Dec. 26, 2022

(86) PCT No.: PCT/CN2022/141966
§ 371 (c)(1),
(2) Date: Jul. 20, 2023

(87) PCT Pub. No.: WO2023/160205
PCT Pub. Date: Aug. 31, 2023

(65) Prior Publication Data
US 2024/0406549 A1 Dec. 5, 2024

(30) Foreign Application Priority Data
Feb. 28, 2022 (CN) .......................... 202210195142.2

(51) Int. Cl.
H04N 23/65 (2023.01)
H04N 23/667 (2023.01)

(52) U.S. Cl.
CPC ......... H04N 23/651 (2023.01); H04N 23/667 (2023.01)

(58) Field of Classification Search
CPC .... H04N 23/65; H04N 23/651; H04N 23/665; H04N 23/667
See application file for complete search history.

(56) References Cited

U.S. PATENT DOCUMENTS

| 10,594,856 | B1 | 3/2020 | He et al. |
| 10,785,458 | B2 | 9/2020 | Seaman et al. |

(Continued)

FOREIGN PATENT DOCUMENTS

| CN | 104156053 B | 12/2015 |
| CN | 105959604 A | 9/2016 |

(Continued)

OTHER PUBLICATIONS

Pathak et al., "What is keeping my phone awake? Characterizing and detecting no-sleep energy bugs in smartphone apps," Proceedings of the 10th International Conference on Mobile Systems, Applications, and Services (MoBiSys' 12), Jun. 25-29, 2012, pp. 267-280.

(Continued)

*Primary Examiner* — Daniel M Pasiewicz
(74) *Attorney, Agent, or Firm* — Fish & Richardson P.C.

(57) ABSTRACT

This application discloses a process control method, an electronic device, and a readable storage medium, and belongs to the field of terminal technologies. The method includes: performing a photographing operation by using a camera application; if the camera application is disabled within a first duration threshold after photographing, controlling a camera service process to hold a wake-up lock, where the camera service process is used to provide an image processing service, the image processing service generates and calls back a corresponding image after the camera application performs the photographing operation, and the wake-up lock is used to prevent an operating system of the electronic device from entering a sleep state; determining an image processing service status of the camera service process; and controlling the camera service process to release the wake-up lock if the camera service process has completed the image processing service.

20 Claims, 8 Drawing Sheets

(56) References Cited

U.S. PATENT DOCUMENTS

| | | |
|---|---|---|
| 2006/0223590 A1 | 10/2006 | Ban et al. |
| 2007/0146540 A1* | 6/2007 | Sasano ................. H04N 23/667 |
| | | 348/E5.042 |
| 2008/0284855 A1 | 11/2008 | Umeyama et al. |
| 2011/0103643 A1 | 5/2011 | Salsman et al. |
| 2015/0215533 A1 | 7/2015 | Ishihara |
| 2020/0193992 A1 | 6/2020 | Kim et al. |
| 2020/0371892 A1 | 11/2020 | Huang et al. |

FOREIGN PATENT DOCUMENTS

| | | |
|---|---|---|
| CN | 108536269 A | 9/2018 |
| CN | 109947484 A | 6/2019 |
| CN | 110572866 A | 12/2019 |
| CN | 111225151 A | 6/2020 |
| CN | 113625881 A | 11/2021 |
| JP | 2005218086 A | 8/2005 |
| KR | 20210011146 A | 2/2021 |
| WO | 2018170586 A1 | 9/2018 |
| WO | 2022002205 A1 | 1/2022 |

OTHER PUBLICATIONS

Al-Haiqi et al., "A new sensors-based covert channel on android," The Scientific World Journal, vol. 2014, Sep. 2014, pp. 1-14.

* cited by examiner

PROCESS CONTROL METHOD, ELECTRONIC DEVICE, AND READABLE STORAGE MEDIUM

CROSS-REFERENCE TO RELATED APPLICATIONS

This application is a national stage of International Application No. PCT/CN2022/141966, filed on Dec. 26, 2022, which claims priority to Chinese Patent Application No. 202210195142.2, filed on Feb. 28, 2022, both of which are incorporated herein by references in their entireties.

TECHNICAL FIELD

This application relates to the field of terminal technologies, and in particular, to a process control method, an electronic device, and a readable storage medium.

BACKGROUND

Currently, a camera application is configured in electronic devices such as a mobile phone and a tablet computer. A user may use the electronic device to perform a photographing operation by using the camera application. After the camera application is triggered to perform a photographing operation, the electronic device generates a corresponding image by using a bottom-layer camera service process.

In some scenarios, after the camera application performs a photographing operation, the user may immediately trigger the electronic device to turn off the screen. However, in a short time after the camera application performs photographing, if the electronic device turns off the screen, because an operating system of the electronic device enters a sleep mode, the bottom-layer camera service process of the electronic device stops before an image is generated, and after the screen is woke up again, a problem that the camera service process crashes and restarts may cause a phenomenon of an image loss.

SUMMARY

This application provides a process control method, an electronic device, and a readable storage medium, so as to resolve a problem, in a related technology, that an image may be lost after an operating system enters a sleep mode in a short time after photographing. The technical solutions are as follows:

According to a first aspect, a process control method is provided and is applied to an electronic device, where the method includes:
performing a photographing operation by using a camera application:
if the camera application is disabled within a first duration threshold after photographing, controlling a camera service process to hold a wake-up lock, where the camera service process is used to provide an image processing service, the image processing service generates and calls back a corresponding image after the camera application performs the photographing operation, and the wake-up lock is used to prevent an operating system of the electronic device from entering a sleep state;
determining an image processing service status of the camera service process; and
controlling the camera service process to release the wake-up lock if the camera service process has completed the image processing service.

In this way, when the camera application is disabled, the camera service process is controlled to obtain the wake-up lock, so that the operating system cannot enter the sleep state even if the electronic device is triggered to enter the sleep state, thereby avoiding a problem that the camera service process cannot run normally, resulting in an image loss. In addition, because the camera service process can run normally, after the electronic device is reawakened, when the camera application is enabled again based on a memory function, the camera service process can normally communicate with the camera service process, that is, the camera application can be connected normally, and a problem that the camera application cannot be connected normally in a short time does not occur.

In an example of this application, the determining an image processing service status of the camera service process includes:
sending a camera disable message to the camera service process by using the camera application;
adding the camera disable message to an image processing message queue by using the camera service process, where the image processing message queue is used to store an image processing message, and the image processing message includes data required when the camera service process generates an image;
querying a status value of a target flag bit when only the camera disable message exists in the image processing message queue, where the target flag bit is used to indicate whether the camera service process has completed an image processing service; and
determining the image processing service status of the camera service process based on the status value of the target flag bit.

In this way, the camera disable message is added to the image processing message queue to determine whether all image processing messages have been processed based on a message processing situation in the image processing message queue. When it is determined that the image processing message in the image processing message queue is empty, the image processing service status is determined, so that it can be effectively determined whether the camera service process has completed the image processing service.

In an example of this application, an image processing module and an image processing management module are running in the camera service process:
the sending a camera disable message to the camera service process by using the camera application includes:
sending a camera disable message to the image processing module in the camera service process by using the camera application; and
receiving the camera disable message by using the image processing module;
the adding the camera disable message to an image processing message queue by using the camera service process includes:
adding the camera disable message to the image processing message queue by using the image processing module;
the querying a status value of a target flag bit when only the camera disable message exists in the image processing message queue includes:
when only the camera disable message exists in the image processing message queue, triggering, by using the image processing module, the image management module to query the status value of the target flag bit; and the determining the image processing service status of the camera service process based on the status value of the target flag bit includes:

determining the image processing service status of the camera service process based on the status value of the target flag bit by using the image processing module.

In this way, when the image processing module determines that no image processing message exists in the image processing message queue, the image processing management module is triggered to detect the target flag bit, so as to determine a completion status of the image processing service based on the target flag bit, thereby implementing detection of the image processing service status of the camera service process.

In an example of this application, the determining the image processing service status of the camera service process based on the status value of the target flag bit includes:

if the status value of the target flag bit is a first value, determining that the camera service process has completed the image processing service: or if the status value of the target flag bit is a second value, determining that the camera service process does not complete the image processing service.

In an example of this application, the method further includes:

starting a timer by using the camera service process; and the controlling the camera service process to release the wake-up lock if the camera service process has completed the image processing service includes:

if timing duration of the timer reaches a second duration threshold and/or the camera service process has completed the image processing service, controlling the camera service process to release the wake-up lock, where the second duration threshold is greater than or equal to target duration, and the target duration includes total duration in which the camera service process generates an image and completes callback of the image.

In this way, the timer is started to perform timing, so that it can be avoided that the electronic device always cannot enter the sleep mode because the camera service process is abnormal, thereby avoiding a problem of abnormal power consumption.

In an example of this application, the first duration threshold is greater than or equal to K and is less than 2K, K is the target duration, and the method further includes:

after an image is generated by using the camera service process, calling back the generated image; and if an image processing message still exists in the image processing message queue, controlling the timer to restart timing.

In this way, the timing operation of the timer is synchronously performed with monitoring of the image processing service status, which avoids triggering, when the camera processing process needs to generate a plurality of images, the camera service process to release the wake-up lock due to timeout of timing of the timer, so that the electronic device enters the sleep mode, and further affects running of the camera processing process.

In an example of this application, a condition for triggering the camera service process to release the wake-up lock is that the camera service process has completed the image processing service, and before the controlling the camera service process to release the wake-up lock, the method further includes:

if the camera service process has completed the image processing service, and the timing duration of the timer does not reach the second duration threshold, controlling the timer to cancel a timing operation.

If the camera service process has completed the image processing service, but the timing duration of the timer does not time out, a timing operation of the timer is meaningless. Therefore, the image processing management module may first cancel the timing operation of the timer, and then control the camera service process to release the wake-up lock. In this way, the timer can be prevented from continuing to perform useless timing.

According to a second aspect, an electronic device is provided, including a memory, a processor, and a computer program stored in the memory and capable of running on the processor. When the processor executes the computer program, the following content is implemented:

performing a photographing operation by using a camera application:

if the camera application is disabled within a first duration threshold after photographing, controlling a camera service process to hold a wake-up lock, where the camera service process is used to provide an image processing service, the image processing service generates and calls back a corresponding image after the camera application performs the photographing operation, and the wake-up lock is used to prevent an operating system of the electronic device from entering a sleep state:

determining an image processing service status of the camera service process; and controlling the camera service process to release the wake-up lock if the camera service process has completed the image processing service.

In an example of this application, the processor is configured to:

send a camera disable message to the camera service process by using the camera application:

add the camera disable message to an image processing message queue by using the camera service process, where the image processing message queue is used to store an image processing message, and the image processing message includes data required when the camera service process generates an image;

query a status value of a target flag bit when only the camera disable message exists in the image processing message queue, where the target flag bit is used to indicate whether the camera service process has completed an image processing service; and determine the image processing service status of the camera service process based on the status value of the target flag bit.

In an example of this application, an image processing module and an image processing management module are running in the camera service process: the processor is configured to:

send a camera disable message to the image processing module in the camera service process by using the camera application:

receive the camera disable message by using the image processing module:

add the camera disable message to the image processing message queue by using the image processing module:

when only the camera disable message exists in the image processing message queue, trigger, by using the image processing module, the image management module to query the status value of the target flag bit; and determine the image processing service status of the camera service process based on the status value of the target flag bit by using the image processing module.

In an example of this application, the processor is configured to:

if the status value of the target flag bit is a first value, determine that the camera service process has completed the image processing service: or if the status value of the target flag bit is a second value, determine that the camera service process does not complete the image processing service.

In an example of this application, the processor is configured to:

start a timer by using the camera service process; and the controlling the camera service process to release the wake-up lock if the camera service process has completed the image processing service includes:

if timing duration of the timer reaches a second duration threshold and/or the camera service process has completed the image processing service, controlling the camera service process to release the wake-up lock, where the second duration threshold is greater than or equal to target duration, and the target duration includes total duration in which the camera service process generates an image and completes callback of the image.

In an example of this application, the first duration threshold is greater than or equal to K and is less than 2K, K is the target duration, and the processor is configured to:

after an image is generated by using the camera service process, call back the generated image; and if an image processing message still exists in the image processing message queue, control the timer to restart timing.

In an example of this application, a condition for triggering the camera service process to release the wake-up lock is that the camera service process has completed the image processing service, and before the controlling the camera service process to release the wake-up lock, the processor is further configured to:

if the camera service process has completed the image processing service, and the timing duration of the timer does not reach the second duration threshold, control the timer to cancel a timing operation.

According to a third aspect, a computer-readable storage medium is provided. The computer-readable storage medium stores instructions, and when the instructions are run on a computer, the computer is enabled to perform the method in the first aspect.

According to a fourth aspect, a computer program product including instructions is provided, and when the instructions are run on a computer, the computer is enabled to perform the method in the first aspect.

Technical effects achieved in the second aspect, the third aspect, and the fourth aspect are similar to technical effects achieved by corresponding technical means in the first aspect, and are not described herein again.

DESCRIPTION OF EMBODIMENTS

Figure 1:
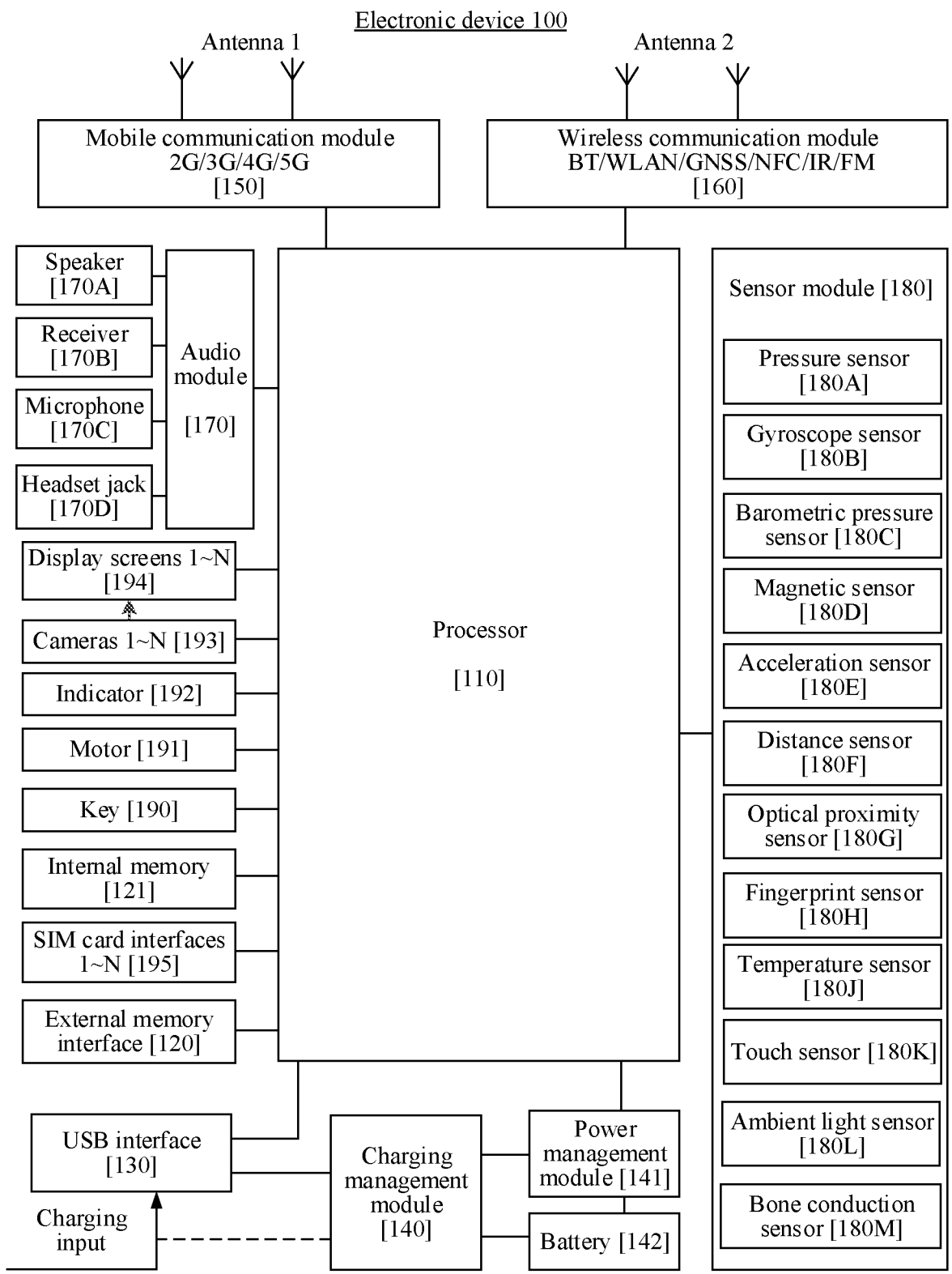
FIG. 1 is a schematic diagram of a structure of an electronic device according to an example embodiment.

To make the objectives, technical solutions, and advantages of this application clearer, the following further describes implementations of this application in detail with reference to the accompanying drawings.

It should be understood that "a plurality of" mentioned in this application refers to two or more. In the descriptions of this application, "/" means "or" unless otherwise specified. For example, A/B may represent A or B. In this specification, "and/or" is merely used to describe an association relationship between associated objects, and indicates that three relationships may exist. For example, "A and/or B" may indicate the following: the following three cases: Only A exists, both A and B exist, and only B exists. In addition, for ease of clearly describing the technical solutions of this application, the words such as "first" and "second" are used to distinguish between same or similar items whose functions are basically the same. A person skilled in the art may understand that the terms "first", "second", and the like, and do not limit a quantity and an execution order, and the terms "first", "second", and the like are not limited to be necessarily different.

Reference to "one embodiment" or "some embodiments" described in this specification of this application or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. Terms "comprise", "include", "have", and variations thereof all mean "including but not limited to", unless otherwise specifically emphasized.

In a short time after a camera application performs photographing, if an electronic device triggers, for example, for a reason such as screen off, an operating system to enter a sleep mode, so that a bottom-layer camera service process of the electronic device stops before an image is generated. However, after the screen is wakened again, the camera service process may fail to run normally, thereby causing an image loss, that is, an image shot at a moment before screen off is easily lost. In addition, because the camera service process crashes, when the camera application is enabled again, the camera application cannot be connected normally in a short time. Therefore, an embodiment of this application provides a process control method, so that an electronic device can be prevented from entering a sleep state immediately after a sleep mode is triggered due to screen off or the like. Therefore, a camera service process can continue to run after screen off of the electronic device, thereby avoiding an image loss or a problem that a camera application cannot be connected normally after being enabled again.

Before the process control method provided in the embodiment of this application is described in detail, an execution body involved in the embodiment of this application is first described.

The method provided in this embodiment of this application may be performed by an electronic device. The electronic device is configured with a camera, and a photographing function can be implemented by using the camera. For example, the electronic device includes a camera application (or referred to as a camera application program), and a user may trigger the camera application, so that the electronic device enables the camera to perform photographing by using the camera. In an embodiment, there may be one or more cameras. In addition, the cameras may include a front-facing camera and/or a rear-facing camera. In an embodiment, the electronic device may be a mobile phone, a tablet computer, a notebook computer, a foldable mobile phone, a foldable tablet computer, or the like. This is not limited in this embodiment of this application.

FIG. 1 is a schematic structural diagram of an electronic device according to an embodiment of this application. As shown in FIG. 1, the electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, so as to complete control over instruction fetching and instruction execution.

The processor 110 may be further configured with a memory configured to store an instruction and data. In some embodiments, the memory in the processor 110 is a cache memory. The memory may store instructions or data that is recently used or cyclically used by the processor 110. If the processor 110 needs to use the instructions or data again, the processor 110 may directly invoke the instructions or data from the memory. Repeated access is avoided, and waiting time of the processor 110 is reduced, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver-transmitter (UART) interface, a mobile industry processor interface (MIPI), a general-purpose input/output (GPIO) interface, a subscriber identity module (SIM) interface, and/or a universal serial bus (USB) interface, and the like. The I2C interface is a two-way synchronization serial bus, and includes a serial data line (SDA) and a serial clock line (SCL). In some embodiments, the processor 110 may include a plurality of sets of I2C interfaces. The processor 110 may be separately coupled to the touch sensor 180K, a charger, a flashlight, the camera 193, and the like through different I2C interfaces. For example, the processor 110 may be coupled to the touch sensor 180K by using an I2C interface, so that the processor 110 communicates with the touch sensor 180K by using the I2C interface, to implement a touch function of the electronic device 100.

The I2S interface may be configured for audio communication. In some embodiments, the processor 110 may include a plurality of sets of I2S interfaces. The processor 110 may be coupled to the audio module 170 via an I2S interface to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication to sample, quantize, and encode an analog signal. In some embodiments, the audio module 170 may be coupled to the wireless communication module 160 by using the PCM interface. In some embodiments, the audio module 170 may also transfer an audio signal to the wireless communication module 160 through the PCM interface, to perform the function of answering a call through the Bluetooth headset.

The UART interface is a universal serial data bus and is used for asynchronous communication. The UART interface may be a bidirectional communication bus. The UART interface may convert to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 by using a UART interface, to implement a Bluetooth function. In some embodiments, the audio module 170 may transmit an audio signal to the wireless communication module 160 through the UART interface, to implement a function of playing music through the Bluetooth headset.

The MIPI may be configured to connect the processor 110 to a peripheral device such as the display 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display 194 through the DSI, to implement a display function of the electronic device 100.

A GPIO interface may be configured by software. The GPIO interface may be configured as a control signal, or may be configured as a data signal. In some embodiments, the GPIO interface may be configured to connect the processor 110 and the camera 193, the display 194, the wireless communication module 160, the audio module 170, the sensor module 180, or the like. The GPIO interface may alternatively be configured as an I2C interface, an I2S interface, a UART interface, a MIPI interface, or the like.

The USB interface 130 is a USB-compliant interface, and may be specifically a mini USB interface, a micro USB interface, a USB Type C interface, or the like. The USB port 130 may be configured to be connected to the charger to charge the electronic device 100, or may be configured to transmit data between the electronic device 100 and a peripheral device, or may be configured to connect to a headset to play audio through the headset. The USB interface 130 may be alternatively configured to connect to another terminal, such as an AR device.

It may be understood that a schematic interface connection relationship between the modules in the embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive a charging input from a charger. The charger may be a wireless charger or a wired charger. In some embodiments of wired charging, the charging management module 140 may receive charging input of a wired charger by using the USB interface 130. In some embodiments of wireless charging, the charging management module 140 may receive a wireless charging input through a wireless charging coil of the electronic device 100. When charging the battery 142, the charging management module 140 may further supply power to the electronic device 100 by using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, the external memory, the display screen 194, the camera 193, the wireless communication module 160, and the like. The power management module 141 may be further configured to monitor parameters such as a battery capacity, a cycle count of a battery, and a battery health state (leakage and impedance). In some other embodiments, the power management module 141 may alternatively be disposed in the processor 110. In some other embodiments, the power management module 141 and the charging management module 140 may be disposed on a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover a single communication frequency band or a plurality of communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 can provide a solution for wireless communication including 2G/3G/4G/5G and the like to be applied to the electronic device 100. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and send the electromagnetic wave to the modem processor for demodulation. The mobile communications module 150 may further amplify a signal modulated by the modem processor, and convert the signal into an electromagnetic wave by using the antenna 1 for radiation. In some embodiments, at least some of functional modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then the demodulator transfers the low-frequency baseband signal obtained through demodulation to the baseband processor for processing. The low-frequency baseband signal is processed by the baseband processor and then transferred to an application processor. The application processor outputs a sound signal by using an audio device (not limited to the speaker 170A, the receiver 170B, or the like), or displays an image or a video by using the display screen 194. In some embodiments, the modulation and demodulation processor may be an independent device. In some other embodiments, the modem processor may be independent of the processor 110, and the modem processor and the mobile communication module 150 or another functional module are disposed in a same device.

The wireless communication module 160 can provide a solution for wireless communication including a wireless local area network (WLAN) (such as a wireless fidelity (Wi-Fi) network), Bluetooth (BT), a global navigation satellite system (GNSS), frequency modulation (FM), a near field communication technology (NFC), an infrared technology (IR) and the like to be applied to the electronic device 100. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communications module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing and is connected to the display screen 194 and the application processor. The GPU is configured to perform mathematical and geometric calculation, and is configured to render graphics. The processor 110 may include one or more GPUs, and the GPU executes a program instruction to generate or change display information.

The display screen 194 is configured to display an image, a video, and the like, The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, and quantum dot light emitting diodes (QLED). In some embodiments, the electronic device 100 may include 1 or N display screens 194, where N is an integer greater than 1.

The electronic device 100 may implement a photographing function by using the ISP, the camera 193, the video codec, the GPU, the display screen 194, the application processor, and the like.

The ISP is configured to handle data returned by the camera 193. For example, during photographing, a shutter is open, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may further perform algorithm optimization on noise, brightness, and a skin tone of the image. The ISP may further optimize parameters such as exposure and a color temperature of a photographing scenario. In some embodiments, the ISP may be arranged in the camera 193.

The camera 193 is configured to capture a still image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into a standard image signal in a format such as RGB or YUV. In some embodiments, the electronic device 100 may include one or N cameras 193. N is an integer greater than 1.

The digital signal processor is configured to process a digital signal, and can process another digital signal in addition to the digital image signal. For example, when the electronic device 100 performs frequency channel selection, the digital signal processor is configured to perform Fourier transformation and the like on frequency channel energy.

The video encoder and decoder is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (NN) computing processor that processes input information rapidly by referring to a structure of a biological neural network, for example, by referring to a transmission mode between human brain neurons, and can further perform self-learning continuously. Applications such as intelligent cognition of the electronic device 100 may be implemented by using the NPU, for example, image recognition, facial recognition, voice recognition, and text understanding.

The external memory interface 120 may be configured to be connected to an external memory card such as a micro SD card, to expand a storage capability of the electronic device 100. The external memory card communicates with the processor 110 by using the external memory interface 120, to implement a data storage function, such as storing a file such as a music or a video in the external storage card.

The internal memory 121 may be configured to store computer-executable program code, and the computer-executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (such as a voice playing function and an image playing function), and the like. The data storage area may store data (such as audio data or an address book) created in a use process of the electronic device 100. In addition, the internal memory 121 may include a high-speed random access memory, and may further include a non-volatile memory, for example, at least one disk storage device, a flash memory device, or a universal flash storage (UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may further be configured to encode and decode audio signals. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" and a "mike", is configured to convert a sound signal into an electrical signal. When making a call or sending a voice message, a user can make a sound near the microphone 170C through the mouth of the user to input a sound signal to the microphone 170C. At least one microphone 170C may be disposed in the electronic device 100. In some other embodiments, the electronic device 100 may be provided with two microphones 170C, to implement a noise reduction function in addition to collecting a sound signal. In some other embodiments, three, four, or more microphones 170C may be disposed in the electronic device 100, to collect a sound signal, reduce noise, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface, or a cellular telecommunications industry association of the USA (CTIA) standard interface.

The pressure sensor 180A is configured to sense a pressure signal, and is capable of converting the pressure signal to an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates having a conducting material. When force is applied to the pressure sensor 180A, a capacitance between electrodes changes. The electronic device 100 determines intensity of pressure based on a change of the capacitance. When a touch operation is performed on the display screen 194, the electronic device 100 detects strength of the touch operation by using the pressure sensor 180A. The electronic device 100 may also calculate a touch position based on a detected signal of the pressure sensor 180A. In some embodiments, touch operations that are applied to a same touch location but have different touch operation intensity may correspond to different operation instructions. For example, when a touch operation whose touch operation strength is less than a pressure threshold is performed on a Messages application icon, an instruction for viewing an SMS message is executed. When a touch operation whose touch operation strength is greater than or equal to the pressure threshold is performed on the Messages application icon, an instruction for creating a new SMS message is executed.

The gyroscope sensor 180B may be configured to determine a motion posture of the electronic device 100. In some embodiments, an angular velocity of the electronic device 100 around three axes (i.e., x, y, and z axes) may be determined through the gyroscope sensor 180B. The gyroscope sensor 180B may be used for image stabilization in image capture. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The barometric pressure sensor 180C is configured to measure atmospheric pressure. In some embodiments, the electronic device 100 calculates an altitude, assists positioning and navigation based on a barometric pressure value measured by the barometric pressure sensor 180C.

The magnetic sensor 180D may include a Hall sensor. The electronic device 100 may detect an opening state or a closing state of a flip leather case by using the magnetic sensor 180D. In some embodiments, when the electronic device 100 is a flip phone, the electronic device 100 may detect opening or closing of a flip cover based on the magnetic sensor 180D, and The electronic device 100 sets, based on the detected opening or closing status of the cover or the flip, a feature such as automatic unlocking of the flip.

The acceleration sensor 180E may detect accelerations of the electronic device 100 in all directions (usually in three axes), and The acceleration sensor can detect a value and a direction of gravity when the electronic device 100 is still. The acceleration sensor 180E may be further configured to identify a posture of the electronic device 100, and is applied to applications such as landscape/portrait orientation switching and a pedometer.

The distance sensor 180F is configured to measure a distance. The electronic device 100 may measure the distance by using infrared or laser. In some embodiments, in a photographing scene, the electronic device 100 may measure a distance by using the distance sensor 180F, to implement fast focusing.

The optical proximity sensor 180G may include, for example, a light emitting diode (LED) and an optical detector. The light-emitting diode may be an infrared emitting diode. The electronic device 100 emits infrared light by using a light emitting diode. The electronic device 100 detects infrared reflected light from a nearby object by using the photodiode. When sufficient reflected light is detected, the electronic device 100 may determine that an object exists near the electronic device 100. When insufficient reflected light is detected, it may be determined that there is no object near the electronic device 100. The electronic device 100 may detect, by using the optical proximity sensor 180G, that the user holds the electronic device 100 close to an ear for a call, to implement automatic screen-off to save power. The optical proximity sensor 180G may alternatively be used in a leather case mode or a pocket mode to automatically unlock or lock a screen.

The ambient light sensor 180L is configured to sense brightness of ambient light. The electronic device 100 may adaptively adjust brightness of the display screen 194 based on the sensed brightness of the ambient light. The ambient light sensor 180L may also be configured to automatically adjust the white balance in photographing. The ambient light sensor 180L may further cooperate with the optical proximity sensor 180G to detect whether the electronic device 100 is in a pocket to prevent an accidental touch.

A fingerprint sensor 180H is configured to collect a fingerprint. The electronic device 100 may implement fingerprint unlock, application lock accessing, fingerprint-based photographing, fingerprint-based call answering, and the like by using a feature of the collected fingerprint.

The temperature sensor 180J is configured to detect a temperature. In some embodiments, the electronic device 100 performs a temperature handling policy based on the temperature detected by the temperature sensor 180J. For example, when the temperature reported by the temperature sensor 180J exceeds a threshold, the electronic device 100 degrades performance of a processor located near the temperature sensor 180J, to reduce power consumption and implement thermal protection. In some other embodiments, when the temperature is less than another threshold, the electronic device 100 heats the battery 142, to prevent the electronic device 100 from being abnormally powered off due to the low temperature. In some other embodiments, when the temperature is less than still another threshold, the electronic device 100 boosts an output voltage of the battery 142, to avoid abnormal power-off caused by the low temperature.

The touch sensor 180K is also referred to as a "touch panel". The touch sensor 180K may be disposed in the display screen 194, and the touch sensor 180K and the display screen 194 constitute a "touchscreen". The touch sensor 180K is configured to detect a touch operation on or near the touch sensor. The touch sensor 180K may transfer the detected touch operation to the application processor, to determine a touch event type. The touch sensor 180K may provide a visual output related to the touch operation by using the display 194. In some other embodiments, the touch sensor 180K may alternatively be disposed on a surface of the electronic device 100, and is at a position different from that of the display screen 194.

The bone conduction sensor 180M may collect a vibration signal. In some embodiments, the bone conduction sensor 180M may obtain a vibration signal of a vibration bone in a human vocal-cord part. The bone conduction sensor 180M may also be in contact with a human pulse to receive a blood pressure pulse signal. In some embodiments, the bone conduction sensor 180M may alternatively be disposed in a headset, to form a bone conduction headset in combination with the headset. The audio module 170 may parse out a voice signal based on the vibration signal of the sound vibration bone obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive a key input and generate a key signal input related to user settings and function control of the electronic device 100.

The motor 191 may generate a vibration prompt. The motor 191 may be configured to provide a vibration prompt for an incoming call, and may also be configured to provide vibration feedback for touch. For example, touch operations performed on different applications (for example, photo taking and audio playing) may correspond to different vibration feedback effects. The motor 191 may also correspond to different vibration feedback effects for touch operations applied to different areas of the display 194. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging status or a change in charge, and may be further configured to indicate a message, a missed incoming call, a notification, and the like.

The SIM card interface 195 is configured to connect to an SIM card. The SIM card may be inserted into the SIM card interface 195 or removed from the SIM card interface 195, to implement contact with or separation from the electronic device 100. The electronic device 100 may support 1 or N SIM card interfaces, N being an integer greater than 1. The SIM card interface 195 may support a Nano SIM card, a Micro SIM card, a SIM card, and the like. A plurality of cards may be inserted into a same SIM card interface 195 at the same time. Types of the plurality of cards may be the same as or different. The SIM card interface 195 may be compatible with different types of SIM cards. The SIM card interface 195 may be further compatible with the external memory card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

Next, a software system of the electronic device 100 is described.

The software system of the electronic device 100 may use a layered architecture, an event-driven architecture, a micro-kernel architecture, a micro service architecture, or a cloud architecture. In this embodiment of this application, an Android (Android) system with a layered architecture is used as an example to describe the software system of the electronic device 100.

Figure 2:
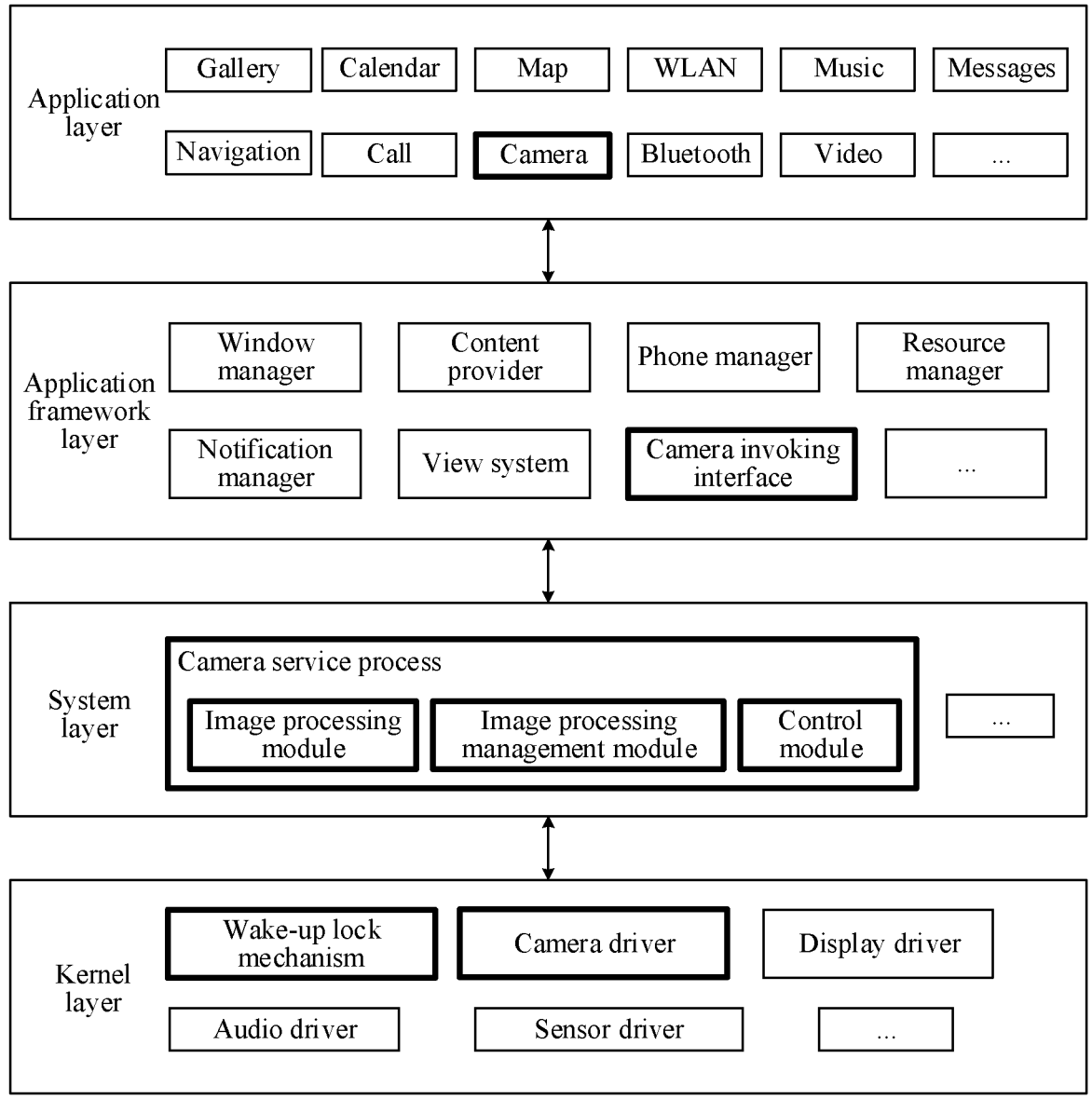
FIG. 2 is a schematic diagram of a software architecture of an electronic device according to an example embodiment.

FIG. 2 is a block diagram of a software system of an electronic device 100 according to an embodiment of this application. As shown in FIG. 2, the layered architecture divides the software into several layers, and each layer has a clear function and division of labor. The layers communicate with each other by using a software interface. In some embodiments, the Android system is divided into four layers: an application layer, an application framework layer, a hardware abstraction layer (HAL) layer, and a kernel layer from top to bottom.

The application layer may include a series of application packages. As shown in FIG. 2, the application packages may include applications such as Camera, Gallery, Calendar, Calls, Map, Navigation, WLAN, Bluetooth, Music, Video, and Messages.

The application framework layer provides an application programming interface (API) and a programming framework for an application at the application layer. The application framework layer includes some predefined functions. As shown in FIG. 2, the application framework layer may include camera invoking interface, a window manager, a content provider, a view system, a phone manager, a resource manager, a notification manager, and the like.

In an embodiment, the camera invoking interface is used to be invoked by a camera application when performing a photographing operation. That is, in a photographing procedure, the camera application invokes the camera invoking interface to interact with a bottom layer (HAL layer) by using the camera invoking interface, so as to load the camera by using the bottom layer, thereby implementing a photographing function.

The window manager is configured to manage a window application. The window manager may obtain a size of the display screen, determine whether there is a status bar, lock the screen, take a screenshot, and the like. The content provider is configured to store and obtain data, so that the data can be accessed by the application program. The data may include videos, images, audio, made and answered calls, browsing history and bookmarks, address books, and the like. The view system includes visual controls such as a control for displaying a text and a control for display a picture. The view system may be configured to construct a display interface of an application program. The display interface may include one or more views, for example, a view that displays an SMS message notification icon, a view that displays a text, and a view that displays a picture. The phone manager is configured to provide a communication function of the electronic device 100, for example, management of a call status (including answering, declining, or the like). The resource manager provides various resources for an application, for example, a localized character string, an icon, a picture, a layout file, and a video file. The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively be a notification that appears in a top status bar of the system in a form of a graph or scroll bar text, for example, a notification of an application running in the background. The notification manager may alternatively be a notification that appears on the display in a form of a dialog window. For example, text information is prompted in the status bar, a notification sound is produced, the electronic device vibrates, or the indicator light blinks.

The HAL layer may also be referred to as an extension layer. The HAL layer generally includes some functional modules defined by a technician. In this embodiment of this application, the HAL layer runs a camera service process. As an example instead of a limitation, the camera service process runs after the electronic device is powered on, and may be referred to as a resident process. The camera service process is used to provide an image processing service, where the image processing service is a service for generating a corresponding image after the camera application performs a photographing operation. During implementation, after the camera application is triggered (for example, triggered by a user) to perform a photographing operation, the camera application sends a camera enable instruction to the camera service process by using the camera invoking interface. After receiving the camera enable instruction, the camera service process controls a camera driver to load the camera, and then may collect scene data by using the camera based on the instruction of the camera application.

When the camera service process obtains the scene data collected by the camera, an image processing operation is performed based on the scene data, so as to generate a corresponding image. Then, the camera service process may feed back the generated image to the camera application in a callback manner, so as to complete a photographing procedure. Further, if the camera application is disabled, the camera application sends a camera disable message to the camera service process by invoking the camera invoking interface. After receiving the camera disable message, the camera service process controls, on the one hand, the camera to power off, and obtains a wake-up lock from the kernel layer on the other hand. The wake-up lock is used to wake the electronic device, so that an operating system of the electronic device cannot enter a sleep state. When a process holding a wake-up lock exists in the electronic device, it may be referred to as that a valid wake-up lock exists in the electronic device, that is, when a valid wake-up lock exists in the electronic device, the operating system cannot enter the sleep state.

As an example of this application, an image processing module, an image processing management module, and a control module run in the camera service process. The image processing module is configured to: load the camera, obtain scene data of the camera, and generate a corresponding image based on the scene data. The control module is configured to obtain a wake-up lock. The image processing management module is configured to indicate the control module to hold or release the wake-up lock. For specific implementation, refer to the following embodiments.

The kernel layer is a layer between hardware and software. The kernel layer includes at least a wake-up lock mechanism (wake-up lock for short), a display driver, a camera driver, an audio driver, and a sensor driver. The camera driver is configured to drive the camera of hardware to load.

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into a raw input event (including information such as touch coordinates and a time stamp of the touch operation). The original input event is stored at the kernel layer. The application framework layer obtains the original input event from the kernel layer, and identifies a control corresponding to the original input event. For example, the touch operation is a single-tap operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

After introducing the execution subject involved in the embodiments of this application, the following describes the application scenarios involved in the embodiments of this application. Herein, that the electronic device is a mobile phone is used as an example for description.

Figure 3:
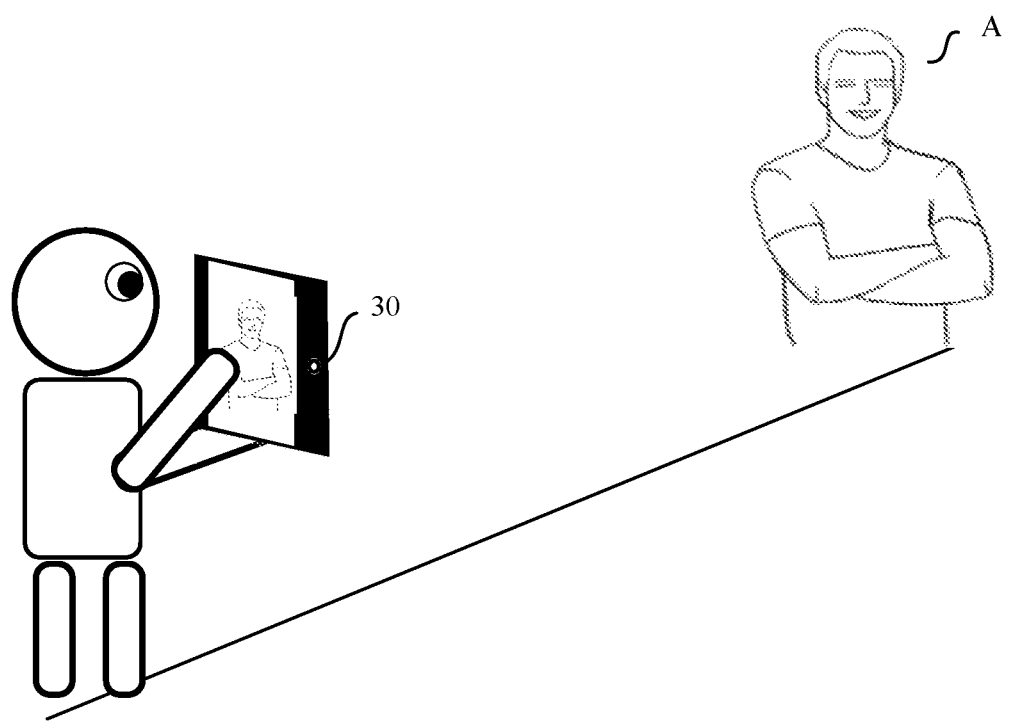
FIG. 3 is a schematic diagram of an application scenario according to an example embodiment.
Figure 4:
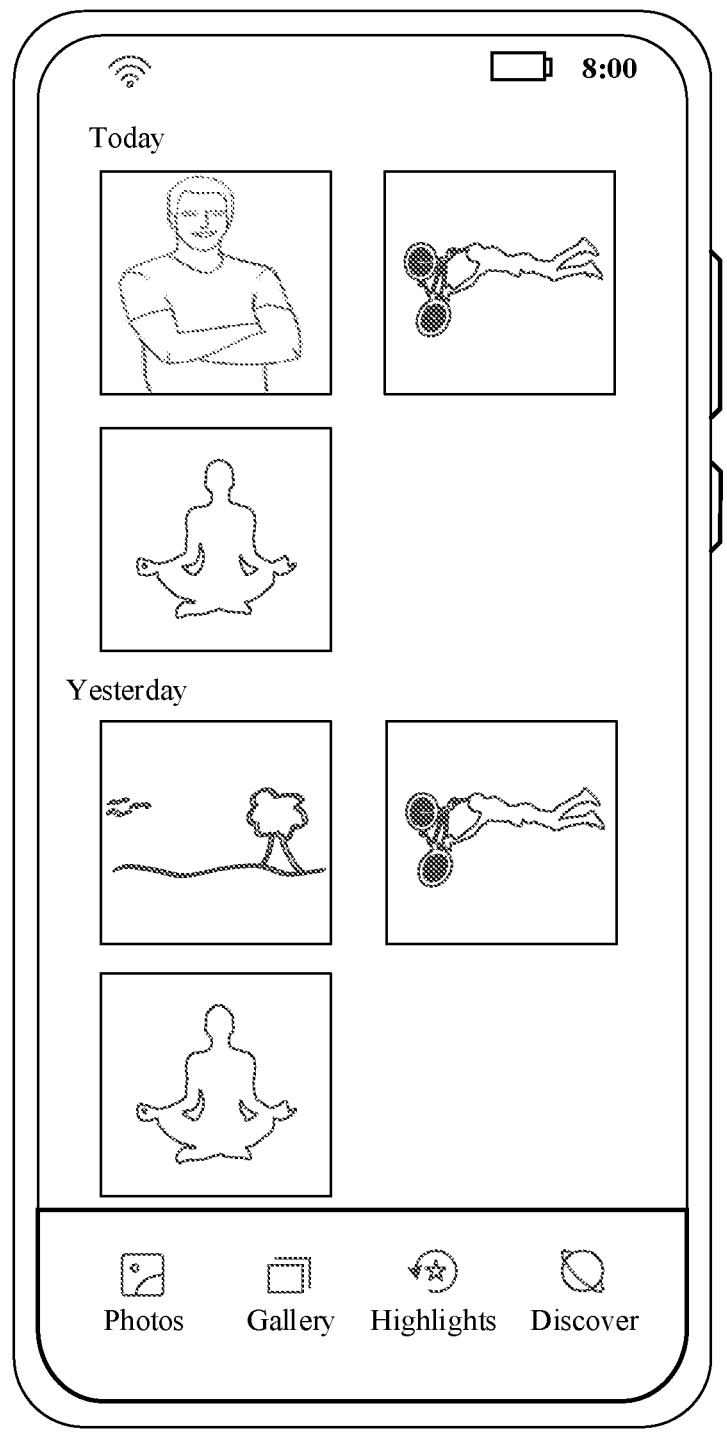
FIG. 4 is a schematic diagram of an album according to an example embodiment.

Referring to FIG. 3, a user performs a photographing operation by using a camera application in the mobile phone, the user triggers the camera application of the mobile phone, and the mobile phone starts the camera application. In a photo mode, the user triggers a photo option 30 to photograph a target A. In response to a trigger operation performed by the user on the photo option 30, the mobile phone performs a photographing operation. In a possible case, after photographing, the user immediately presses a power-off key of the mobile phone, and the mobile phone enters a screen-off mode. In another possible case, after photographing, the user immediately places the mobile phone in a pocket, and the mobile phone enters the screen-off mode. In this embodiment of this application, when the screen of the mobile phone is awakened again, the user may query an album of the mobile phone for an image of the target A photographed before the screen of the mobile phone is off, for example, as shown in FIG. 4.

In an embodiment, in the photo mode, the user triggers the photo option 30 to photograph the target A. In response to a trigger operation performed by the user on the photo option 30, the mobile phone performs a photographing operation. After photographing, the user disables the camera application immediately, and immediately after disabling the camera application, triggers the mobile phone to enter the screen-off mode (for example, presses the power-off key of the mobile phone). In this embodiment of this application, when the screen of the mobile phone is awakened again, the user may query the album of the mobile phone for an image of the target A photographed before the screen of the mobile phone is off, for example, as shown in FIG. 4.

Figure 5:
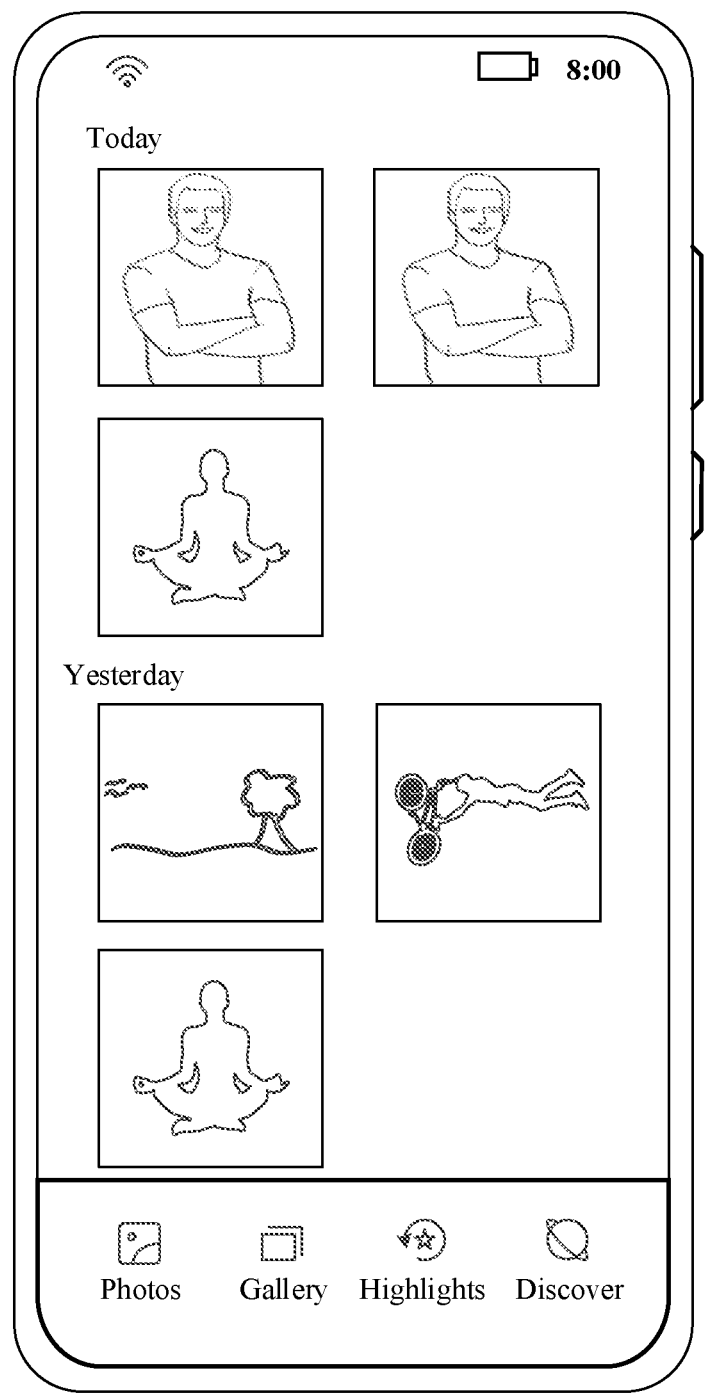
FIG. 5 is a schematic diagram of an album according to another example embodiment.

In an embodiment, the user taps the photo option 30 in the camera application continuously and quickly for multiple times (for example, twice), and presses the power-off key of the mobile phone in a short time after photographing, so that the mobile phone enters the screen-off mode, or puts the mobile phone in the pocket immediately, so that the mobile phone enters the screen-off mode. In this embodiment of this application, after the user triggers the mobile phone to wake up again, the user may query, from a camera of the mobile phone, a plurality of images of the target A photographed by the mobile phone before the screen is off, for example, as shown in FIG. 5.

Figure 6:
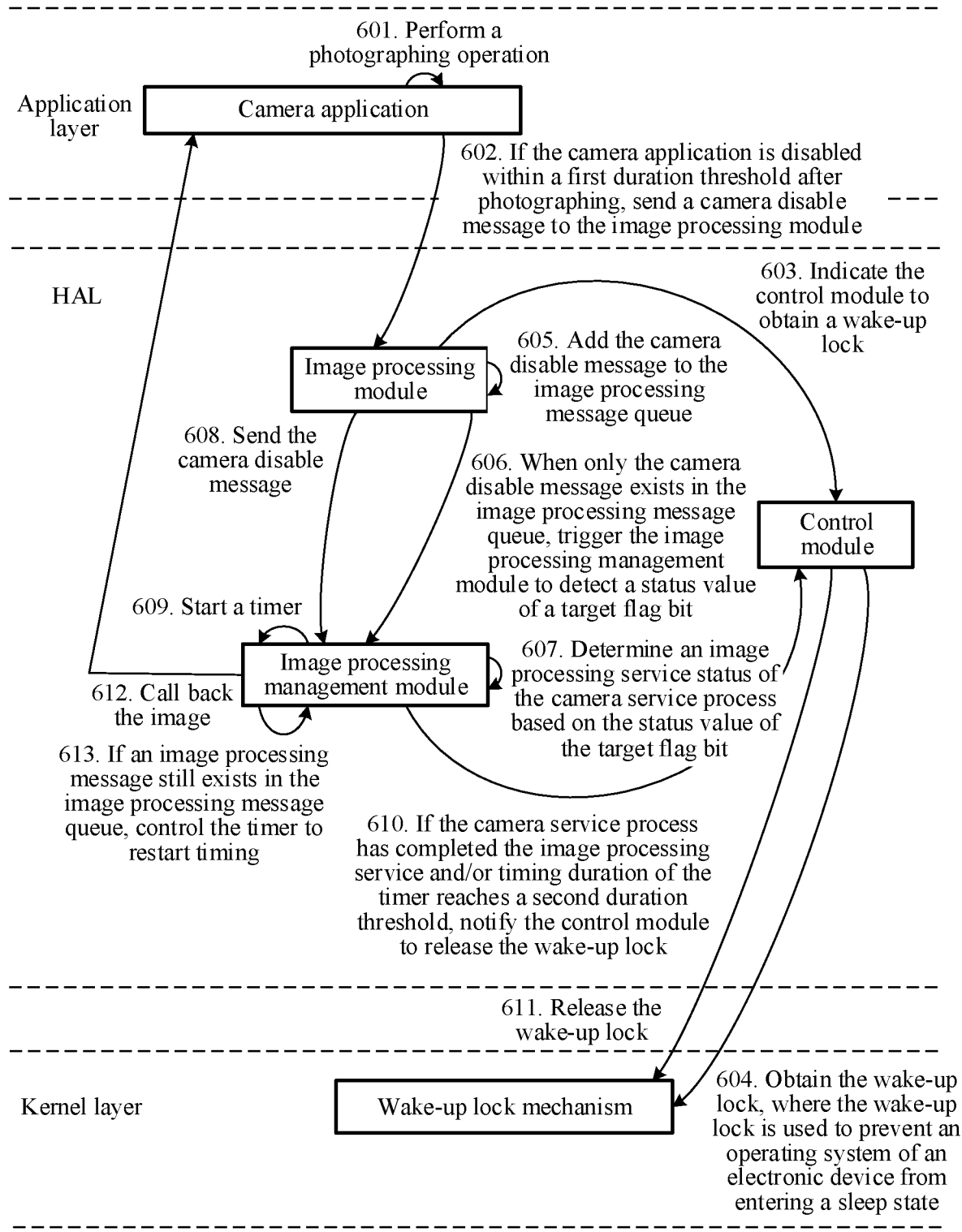
FIG. 6 is a schematic flowchart of a process control method according to an example embodiment.

After introducing the execution body and the application scenario involved in the embodiments of this application, the following describes in detail the process control method provided in the embodiments of this application with reference to the accompanying drawings. Referring to FIG. 6, FIG. 6 is a schematic flowchart of a process control method according to an example embodiment. As an example instead of a limitation, the method may be applied to the foregoing electronic device 100. In this embodiment, an example in which the electronic device 100 is implemented by using an internal module is used for description. The method may include some or all of the following content:

601: A camera application performs a photographing operation.

In an embodiment, an application icon of the camera application is displayed on a display interface of the electronic device. When a user wants to use the electronic device for photographing, the application icon of the camera application may be tapped. In response to a trigger operation performed by the user on the application icon of the camera application, the electronic device starts the camera application. After starting the camera application, the electronic device controls a camera driver by using a camera service process to load a camera.

Referring to FIG. 3, the photo option 30 is provided on the display interface of the camera application. In response to the trigger operation performed by the user on the photo option 30, the camera application sends a photographing instruction to the camera service process. Correspondingly, the camera service process receives the photographing instruction by using an image processing module. Each time the image processing module receives a photographing instruction, the camera is controlled to obtain scene data, and a plurality of image processing messages are generated based on the scene data and a processing configuration parameter. The processing configuration parameter refers to a configuration parameter related to processing of the scene data, for example, includes but is not limited to resolution and a frame rate. The image processing module adds the generated plurality of image processing messages to an image processing message queue. In this way, the image processing module may process the plurality of image processing messages in the image processing message queue according to a first-in-first-out principle, so as to generate an image corresponding to the photographing instruction.

It should be noted that, in a process of generating each image, the camera service process generally generates a plurality of image processing messages, and then sequentially processes each image processing message in the plurality of image processing messages. After all the plurality of image processing messages are processed, an image processing procedure is completed, and an image corresponding to one photographing instruction is generated. That is, generating one image usually requires processing a plurality of image processing messages.

602: If the camera application is disabled within a first duration threshold after photographing, the camera application sends a camera disable message to the image processing module.

The first duration threshold may be set based on an actual requirement, and is generally set to a very short value.

In an example, when the camera application is enabled, if the electronic device enters a screen off state, the camera application is disabled, and in a conventional case, after the electronic device enters the screen off state, an operating system enters a sleep mode. In another example, if the camera application is disabled after photographing, in this case, if the electronic device enters the screen off state, the operating system enters the sleep mode. In any one of the foregoing scenarios, if the operating system enters the sleep mode in a short time after the camera application is disabled, it is easily caused that a bottom-layer camera service process cannot complete an image processing service. However, because the operating system enters the sleep mode, the camera service process cannot run normally, thereby causing an image loss problem.

Therefore, in this embodiment of this application, in a short time after the camera application performs photographing, if the camera application is disabled, a camera disable message is sent to the image processing module, where the camera disable message is used to indicate the camera application to enter a disabled state. Correspondingly, after receiving the camera disable message, the image processing module performs the following operation in step 603 on the one hand, and performs the following operation in step 607 on the other hand.

It should be noted that, the foregoing is merely described by using an example in which the electronic device is triggered to enter the sleep mode due to screen off. In another embodiment, the electronic device may be triggered to enter the sleep mode by using another condition. This is not limited in this embodiment of this application.

603: The image processing module indicates a control module to obtain a wake-up lock, where the wake-up lock is used to prevent the operating system of the electronic device from entering the sleep state.

As described above, because the camera service process performs an image processing service in a background after the camera application performs a photographing operation, if the electronic device enters the sleep state in a short time after photographing, the camera service process may not complete the image processing service, and because the operating system enters the sleep mode, the camera service process stops. Therefore, after receiving the camera disable message by using the image processing module, the camera service process notifies the control module, so that the control module obtains the wake-up lock from a kernel layer.

604: The control module obtains the wake-up lock.

In an example, a specific implementation in which the control module obtains the wake-up lock may include: The control module obtains a target system service, and then invokes an interface of the target system service, so as to obtain the wake-up lock. The target system service is a system service that has a wake-up lock. For example, the target system service is a system suspend service.

In this way, the camera service process holds a wake-up lock, that is, there is a valid wake-up lock in the electronic device, so that the operating system can be prevented from entering the sleep state.

605: The image processing module adds the camera disable message to the image processing message queue.

It can be learned from the foregoing that the image processing message queue is used to store an image processing message, and the image processing message includes data required when the camera service process generates an image.

The image processing module adds the camera disable message to an end position in the image processing message queue, so that the camera disable message is the last message processed by the image processing module. In an embodiment, the image processing module adds the camera disable message to the image processing message queue in an asynchronous transmission manner.

It should be noted that, the foregoing is described by using an example in which a plurality of image processing messages and a camera disable message are stored in the image processing message queue. In another embodiment, a plurality of image processing messages and a camera disable message may be stored in another manner that can indicate a sequence of message processing. This is not limited in this embodiment of this application.

It should be noted that, there is no strict sequence of execution between step 605 and step 603, which is not limited in this embodiment of this application.

606: When only the camera disable message exists in the image processing message queue, the image processing module triggers the image processing management module to detect a status value of a target flag bit.

The target flag bit is used to indicate whether the camera service process has completed the image processing service. In an example, after completing the image processing procedure, the image processing module changes the status value of the target flag, so that a changed status value indicates that the camera service process has completed the image processing service.

In an example, a quantity of target flag bits includes a first value or a second value, where the first value is used to indicate that the camera service process has completed the image processing service, and the second value is used to indicate that the camera service process has not completed the image processing service. Having completed the image processing service means that all image processing messages are processed to generate a corresponding image.

The first value may be set based on an actual requirement. For example, the first value may be 1. Similarly, the second value may be set based on an actual requirement. For example, the second value may be 0.

If only the camera disable message exists in the image processing message queue, that is, no image processing message exists in the image processing message queue, it indicates that no unprocessed image processing message exists, and therefore, it indicates that the image processing module may have processed or is processing the last image processing message. In this case, the image processing module may trigger, by using an event triggering mechanism, the image processing management module to detect the status value of the target flag bit, so as to detect an image processing pipeline complete status.

607: The image processing management module determines an image processing service status of the camera service process based on the status value of the target flag bit.

The determining an image processing service status of the camera service process based on the status value of the target flag bit includes the following two cases: In one case, if the status value of the target flag bit is the first value, it is determined that the camera service process has completed the image processing service. In the other case, if the status value of the target flag bit is the second value, it is determined that the camera service process does not complete the image processing service.

If the camera service process does not complete the image processing service, the image processing service status of the camera service process continues to be detected. Otherwise, if the camera service process has completed the image processing service, the following step 610 is performed.

608: The image processing module sends the camera disable message to the image processing management module.

In an embodiment, after receiving the camera disable message, the image processing module sends the camera disable message to the image processing management module in a synchronous transmission manner.

It should be noted that, there is no strict sequence of execution between step 608 and the foregoing step 603. This is not strictly limited in this embodiment of this application.

609: The image processing management module starts a timer.

In one case, if the camera service process is frozen, the target flag bit detected by the image processing management module is always the second value. In this way, the electronic device cannot always enter the sleep mode in the screen off state, thereby causing power consumption of the electronic device. To avoid occurrence of this case, after receiving the camera disable message, the image processing module sends the camera disable message to the image processing management module, so that the image processing management module starts the timer to start timing, so that the control module is controlled to release the wake-up lock in a timeout manner.

610: If the camera service process has completed the image processing service and/or timing duration of the timer reaches a second duration threshold, the image processing management module notifies the control module to release the wake-up lock.

The second duration threshold may be set based on an actual requirement. Generally, duration of the second duration threshold is greater than or equal to target duration, and the target duration includes total duration in which the camera service process generates an image and completes callback of the image, which may be specifically determined based on an empirical value. In this way, the following case is avoided: When the image processing module does not complete the image processing service, the control module is triggered, due to timing timeout of the timer, to release the wake-up lock, so that the electronic device enters the sleep state, thereby affecting image generation.

In an example, the second duration threshold is greater than or equal to K and is less than 2K, where K refers to the target duration, that is, only one image can be generated and called back within the second duration threshold.

In one case, if the camera service process has completed the image processing service, it indicates that the camera service process has generated the image corresponding to the photographing instruction, and in this case, no image loss phenomenon exists. To not prevent the system from entering the sleep state, the image processing management module notifies the control module to release the wake-up lock.

In another case, if the timing duration of the timer reaches the second duration threshold, it indicates that the timing times out. In this case, the image processing management module also triggers the control module to release the wake-up lock.

In still another case, the camera service process may have completed the image processing service, and the timing duration of the timer reaches the second duration threshold. In this case, the image processing management module triggers the control module to release the wake-up lock, so that the electronic device enters the sleep mode.

In an embodiment, when a condition for triggering the camera service process to release the wake-up lock is that the camera service process has completed the image processing service, before the camera service process is controlled to release the wake-up lock, if the timing duration of the timer does not reach the second duration threshold, the image processing management module controls the timer to cancel the timing operation.

611: The control module releases the wake-up lock.

In an example, after the wake-up lock is released, there is no valid wake-up lock in the electronic device. In this case, if the electronic device is still in the screen off state, the electronic device enters the sleep mode.

It is not difficult to understand that if the camera service process has completed the image processing service, but the timing duration of the timer does not time out, a timing operation of the timer is meaningless. Therefore, the image processing management module may first cancel the timing operation of the timer, and then control the camera service process to release the wake-up lock. In this way, the timer can be prevented from continuing to perform useless timing.

Further, when the second duration threshold is greater than or equal to K and is less than 2K, the method further includes the following content:

612: After the image processing module generates an image, the image processing management module calls back the generated image.

In an example, each time generating an image corresponding to a photographing instruction, the image processing module sends the generated image to the image processing management module, and the image processing management module sends the generated image to the camera application in a callback manner. The camera application may store the image in an album, so that the user can view the image.

613: If an image processing message still exists in the image processing message queue, the image processing management module controls the timer to start timing again.

In a possible scenario, the user may continuously and quickly trigger the camera application for a plurality of times to perform a photographing operation. In this case, the camera application sends a photographing instruction to the camera service process for a plurality of consecutive times in response to each trigger operation of the user. The camera service process sequentially receives the photographing instruction by using the image processing module. The image processing module obtains scene data by using the camera based on a photographing instruction received each time, generates a plurality of image processing messages based on scene data obtained each time and a processing configuration parameter, and adds the plurality of image processing messages to the image processing message queue. In this way, the image processing message queue includes a plurality of image processing messages corresponding to each of a plurality of to-be-generated images. Therefore, if the camera service process generates an image by using the image processing module, an image processing message corresponding to another to-be-generated image may exist in the image processing message queue. Therefore, if an image processing message still exists in the image processing message queue, it indicates that a to-be-generated image exists, that is, the camera service process further needs to execute the image processing service. In this case, because maximum timing duration of the timer is the second duration threshold, and the second duration threshold is greater than or equal to K and is less than 2K, if timing of the timer times out, it is likely that the camera service process cannot process another image processing message in time. Therefore, the image processing management module controls the timer to start timing again, that is, initializes the timer.

In this way, the timing operation of the timer is synchronously performed with monitoring of the image processing service status, which avoids triggering, when the camera processing process needs to generate a plurality of images, the camera service process to release the wake-up lock due to timeout of timing of the timer, so that the electronic device enters the sleep mode, and further affects running of the camera processing process.

In this embodiment of this application, a photographing operation is performed by using the camera application. If the camera application is disabled within a short time after the camera application performs photographing, to prevent the electronic device from entering the sleep mode, the camera service process is controlled to hold the wake-up lock, so that the operating system of the electronic device cannot enter the sleep mode by using the wake-up lock, thereby avoiding impact on execution of the image processing service by the camera application process, that is, the camera application process can still continue to execute the image processing service. Then, the image processing service status of the camera service process is determined. If the camera service process has completed the image processing service, in this case, the operating system may be allowed to enter the sleep mode. Therefore, the camera service process is controlled to release the wake-up lock, so that the operating system can normally enter the sleep mode. In this way, after the camera application is disabled, the camera service process is controlled to obtain and release the wake-up lock, so that the operating system cannot enter the sleep state in a short time, thereby avoiding a problem that the camera service process cannot run normally, which causes an image loss.

In addition, because the camera service process still runs normally after the screen of the electronic device is off, after the electronic device is reawakened, when the camera application is enabled again based on a memory function, the camera service process can normally communicate with the camera service process, that is, the camera application can be connected normally, and a problem that the camera application cannot be connected normally in a short time does not occur.

Figure 7:
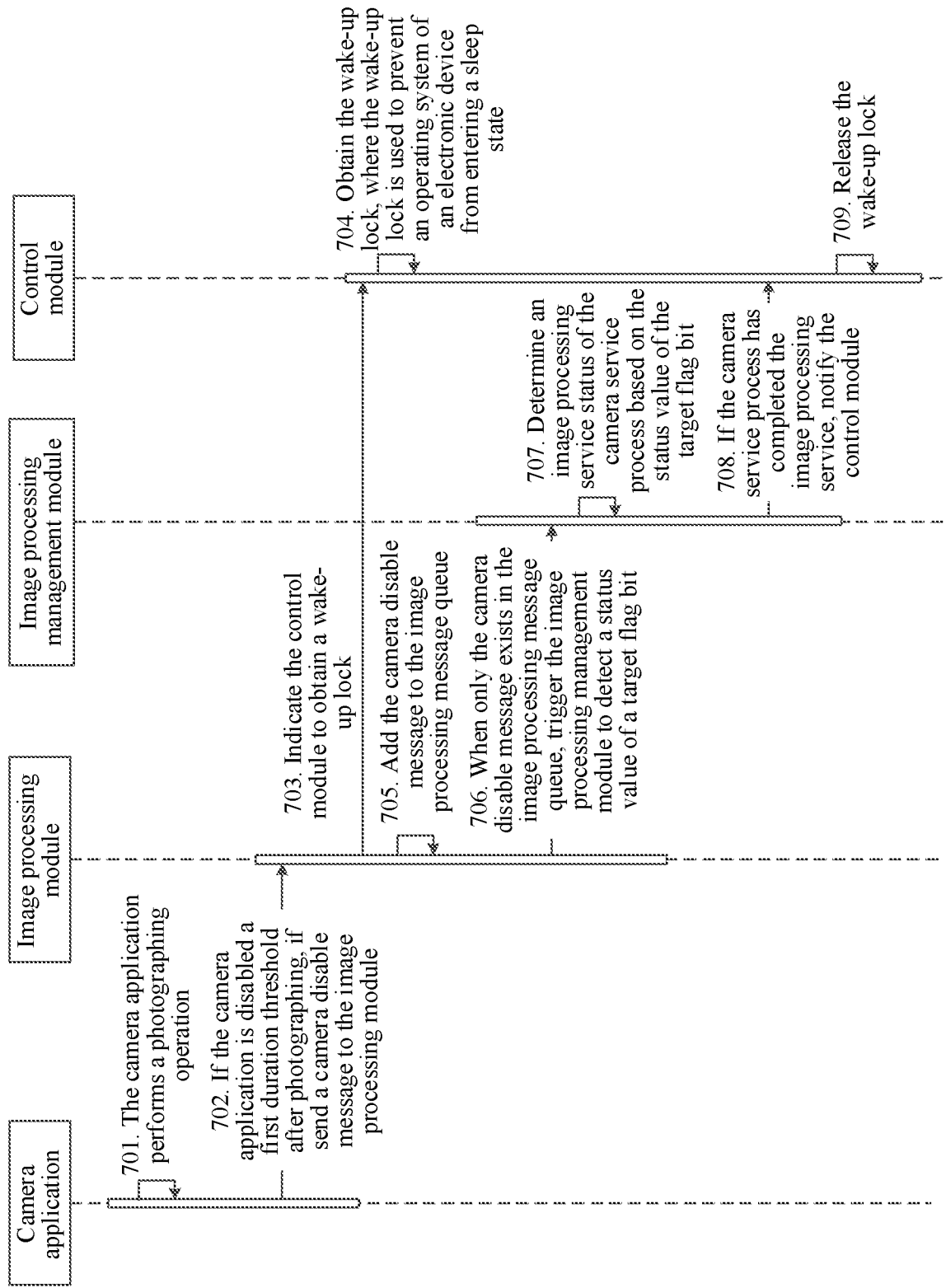
FIG. 7 is a schematic flowchart of a process control method according to another example embodiment.

Referring to FIG. 7, FIG. 7 is a flowchart of a process control method according to another example embodiment. As an example instead of a limitation, the method is applied to the electronic device 100. Herein, an example in which the electronic device is implemented by using interaction of a plurality of modules is used for description. The method may include the following content:

701: A camera application performs a photographing operation.

For specific implementation, refer to step 601 in the embodiment shown in FIG. 6. Details are not described herein again.

702: If the camera application is disabled within a first duration threshold after photographing, the camera application sends a camera disable message to the image processing module.

In an example, when the camera application is enabled, if the electronic device enters a screen off state, the camera application is disabled, and in a conventional case, after the electronic device enters the screen off state, an operating system enters a sleep mode. In this embodiment of this application, if the camera application is disabled within a short time after the camera application performs photographing, the camera application sends a camera disable message to the image processing module, and the camera application is disabled. The camera disable message is used to indicate that the camera application enters a disabled state.

703: The image processing module indicates a control module to obtain a wake-up lock.

As described above, because the camera service process performs an image processing service in a background after the camera application performs a photographing operation, if the electronic device enters the sleep state in a short time after photographing, the camera service process may not complete the image processing service, and because the operating system enters the sleep mode, the camera service process stops. Therefore, after receiving the camera disable message by using the image processing module, the camera service process notifies the control module, so that the control module obtains the wake-up lock from a kernel layer.

704: The control module obtains the wake-up lock, where the wake-up lock is used to prevent an operating system of the electronic device from entering a sleep state.

In an example, a specific implementation in which the control module obtains the wake-up lock may include: The control module obtains a target system service, and then invokes an interface of the target system service, so as to obtain the wake-up lock. The target system service is a system service that has a wake-up lock. For example, the target system service is a system suspend service.

In this way, the camera service process holds a wake-up lock, that is, there is a valid wake-up lock in the electronic device, so that the operating system can be prevented from entering the sleep state.

705: The image processing module adds the camera disable message to the image processing message queue.

It can be learned from the foregoing that the image processing message queue is used to store an image processing message, and the image processing message includes data required when the camera service process generates an image.

The image processing module adds the camera disable message to an end position in the image processing message queue, so that the camera disable message is the last message processed by the image processing module. In an embodiment, the image processing module adds the camera disable message to the image processing message queue in an asynchronous transmission manner.

It should be noted that, the foregoing is described by using an example in which a plurality of image processing messages and a camera disable message are stored in the image processing message queue. In another embodiment, a plurality of image processing messages and a camera disable message may be stored in another manner that can indicate a sequence of message processing. This is not limited in this embodiment of this application.

It should be noted that, there is no strict sequence of execution between step 703 and step 705.

706: When only the camera disable message exists in the image processing message queue, the image processing module triggers the image processing management module to detect a status value of a target flag bit.

The target flag bit is used to indicate whether the camera service process has completed the image processing service. In an example, after completing the image processing procedure, the image processing module changes the status value of the target flag, so that a changed status value indicates that the camera service process has completed the image processing service.

In an example, a quantity of target flag bits includes a first value or a second value, where the first value is used to indicate that the camera service process has completed the image processing service, and the second value is used to indicate that the camera service process has not completed the image processing service. Having completed the image processing service means that all image processing messages are processed or may be understood as that a corresponding image has been generated.

The first value may be set based on an actual requirement. For example, the first value may be 1. Similarly, the second value may be set based on an actual requirement. For example, the second value may be 0.

If only the camera disable message exists in the image processing message queue, that is, no image processing message exists in the image processing message queue, it indicates that no unprocessed image processing message exists, and therefore, it indicates that the image processing module may have processed or is processing the last image processing message. In this case, the image processing module may trigger, by using an event triggering mechanism, the image processing module to detect the status value of the target flag bit, so as to detect an image processing pipeline complete status.

707: The image processing management module determines an image processing service status of the camera service process based on the status value of the target flag bit.

The determining an image processing service status of the camera service process based on the status value of the target flag bit includes the following two cases: In one case, if the status value of the target flag bit is the first value, it is determined that the camera service process has completed the image processing service. In the other case, if the status value of the target flag bit is the second value, it is determined that the camera service process does not complete the image processing service.

If the camera service process does not complete the image processing service, the image processing service status of the camera service process continues to be detected. Otherwise, if the camera service process has completed the image processing service, the following step 708 is performed.

708: If the camera service process has completed the image processing service, the image processing management module notifies the control module.

709: The control module releases the wake-up lock.

In one case, if the camera service process has completed the image processing service, it indicates that the camera service process has generated the image corresponding to the photographing instruction, and in this case, no image loss phenomenon exists. To not prevent the system from entering the sleep state, the control module is controlled to release the wake-up lock. After the wake-up lock is released, there is no valid wake-up lock in the electronic device. In this case, if the electronic device is still in the screen off state, the electronic device enters the sleep mode.

In this embodiment of this application, a photographing operation is performed by using the camera application. If the camera application is disabled within a short time after the camera application performs photographing, to prevent the electronic device from entering the sleep mode, the camera service process is controlled to hold the wake-up lock, so that the operating system of the electronic device cannot enter the sleep mode by using the wake-up lock, thereby avoiding impact on execution of the image processing service by the camera application process, that is, the camera application process can still continue to execute the image processing service. Then, the image processing service status of the camera service process is determined. If the camera service process has completed the image processing service, in this case, the operating system may be allowed to enter the sleep mode. Therefore, the camera service process is controlled to release the wake-up lock, so that the operating system can normally enter the sleep mode. In this way, after the camera application is disabled, the camera service process is controlled to obtain and release the wake-up lock, so that the operating system cannot enter the sleep state in a short time, thereby avoiding a problem that the camera service process cannot run normally, which causes an image loss.

In addition, because the camera service process still runs normally after the screen of the electronic device is off, after the electronic device is reawakened, when the camera application is enabled again based on a memory function, the camera service process can normally communicate with the camera service process, that is, the camera application can be connected normally, and a problem that the camera application cannot be connected normally in a short time does not occur.

Figure 8:
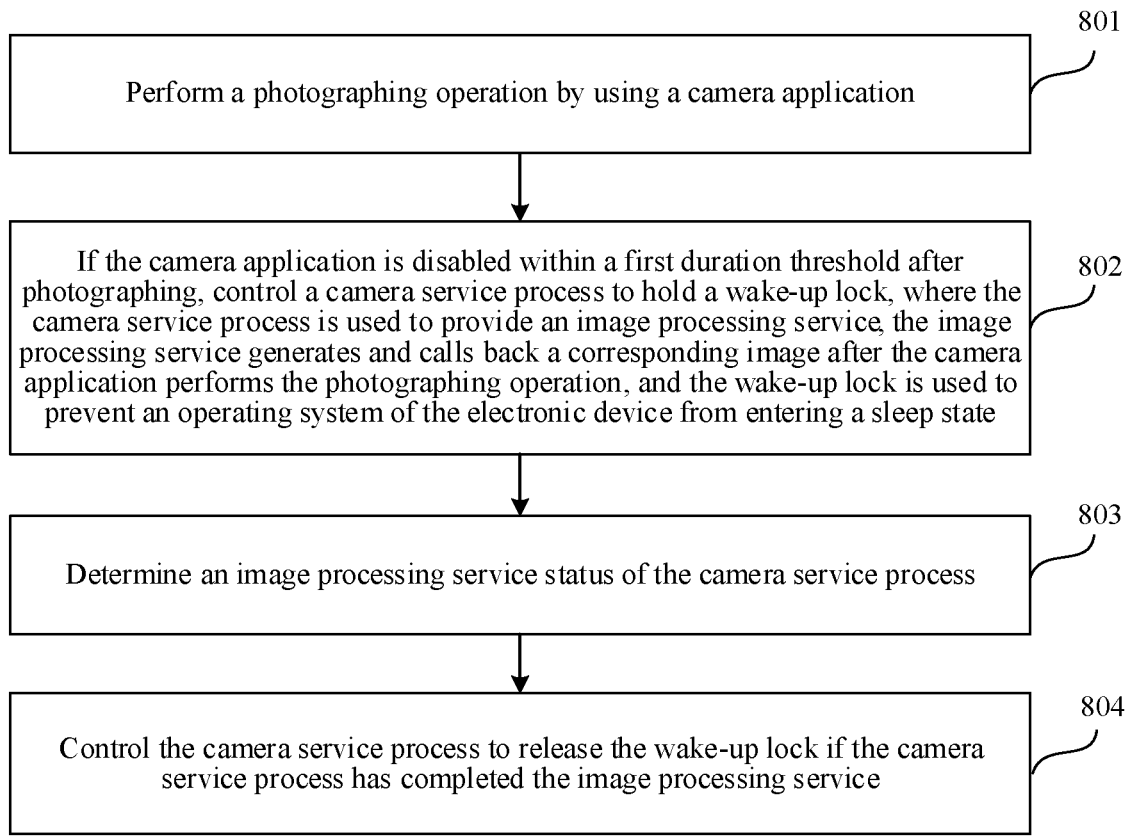
FIG. 8 is a schematic flowchart of a process control method according to another example embodiment.

Referring to FIG. 8, FIG. 8 is a flowchart of a process control method according to another embodiment. As an example instead of a limitation, the method is applied to an electronic device, and the method may include some or all of the following content:

Step 801: Perform a photographing operation by using a camera application.

For specific implementation thereof, refer to step 601 in the foregoing embodiment shown in FIG. 6.

Step 802: If the camera application is disabled within a first duration threshold after photographing, control a camera service process to hold a wake-up lock, where the camera service process is used to provide an image processing service, the image processing service generates and calls back a corresponding image after the camera application performs the photographing operation, and the wake-up lock is used to prevent an operating system of the electronic device from entering a sleep state.

Step 803: Determine an image processing service status of the camera service process.

In an example, a specific implementation of step 803 may include: sending a camera disable message to the camera service process by using the camera application; adding the camera disable message to an image processing message queue by using the camera service process, where the image processing message queue is used to store an image processing message, and the image processing message includes data required when the camera service process generates an image: querying a status value of a target flag bit when only the camera disable message exists in the image processing message queue, where the target flag bit is used to indicate whether the camera service process has completed an image processing service; and determining the image processing service status of the camera service process based on the status value of the target flag bit.

Specifically, the camera disable message is sent to the image processing module in the camera service process by using the camera application, and the camera disable message is received by using the image processing module. The image processing module adds the camera disable message to the image processing message queue. When only the camera disable message exists in the image processing message queue, the image processing module triggers the image management module to query a status value of a target flag bit. The image processing module determines an image processing service status of the camera service process based on the status value of the target flag bit.

In an example, the determining an image processing service status of the camera service process based on the status value of the target flag bit includes: if the status value of the target flag bit is a first value, determining that the camera service process has completed the image processing service: or if the status value of the target flag bit is a second value, determining that the camera service process does not complete the image processing service.

Step 804: Control the camera service process to release the wake-up lock if the camera service process has completed the image processing service.

In an embodiment, a timer is initiated by using the camera service process. In this case, implementation of step 804 includes: if timing duration of the timer reaches a second duration threshold and/or the camera service process has completed the image processing service, controlling the camera service process to release the wake-up lock, where the second duration threshold is greater than or equal to target duration, and the target duration includes total duration in which the camera service process generates an image and completes callback of the image.

In an embodiment, the first duration threshold is greater than or equal to K and is less than 2K, and K refers to the target duration. In this case, after an image is generated by using the camera service process, the generated image is called back. If an image processing message still exists in the image processing message queue, the timer is controlled to restart timing.

In an embodiment, a condition for triggering the camera service process to release the wake-up lock is that the camera service process has completed the image processing service, and before the controlling the camera service process to release the wake-up lock, the method further includes: if the camera service process has completed the image processing service, and the timing duration of the timer does not reach the second duration threshold, controlling the timer to cancel a timing operation.

In this embodiment of this application, a photographing operation is performed by using the camera application. If the camera application is disabled within a short time after the camera application performs photographing, to prevent the electronic device from entering the sleep mode, the camera service process is controlled to hold the wake-up lock, so that the operating system of the electronic device cannot enter the sleep mode by using the wake-up lock, thereby avoiding impact on execution of the image processing service by the camera application process, that is, the camera application process can still continue to execute the image processing service. Then, the image processing service status of the camera service process is determined. If the camera service process has completed the image processing service, in this case, the operating system may be allowed to enter the sleep mode. Therefore, the camera service process is controlled to release the wake-up lock, so that the operating system can normally enter the sleep mode. In this way, after the camera application is disabled, the camera service process is controlled to obtain and release the wake-up lock, so that the operating system cannot enter the sleep state in a short time, thereby avoiding a problem that the camera service process cannot run normally, which causes an image loss.

Figure 9:
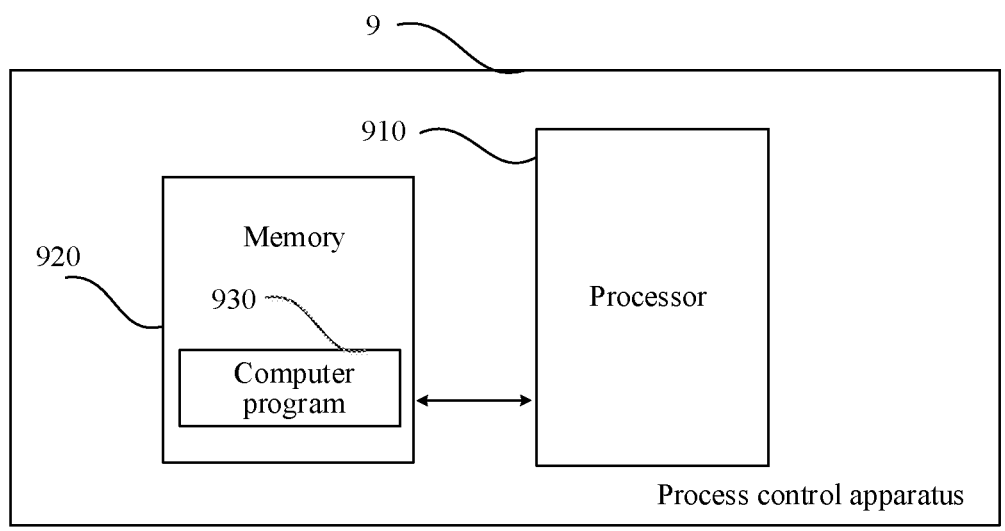
FIG. 9 is a schematic diagram of a structure of a process control apparatus according to an example embodiment.

FIG. 9 is a schematic diagram of a structure of a process control apparatus according to an embodiment of this application. The apparatus may be implemented as a part or all of an electronic device by using software, hardware, or a combination thereof. The electronic device may be the electronic device shown in FIG. 1. Referring to FIG. 9, a process control apparatus 9 includes: a processor 910, a memory 920, and a computer program 930 stored in the memory and capable of running on the processor, where the processor 910 implements the following content when executing the computer program:

performing a photographing operation by using a camera application:
if the camera application is disabled within a first duration threshold after photographing, controlling a camera service process to hold a wake-up lock, where the camera service process is used to provide an image processing service, the image processing service generates and calls back a corresponding image after the camera application performs the photographing operation, and the wake-up lock is used to prevent an operating system of the electronic device from entering a sleep state:
determining an image processing service status of the camera service process; and
controlling the camera service process to release the wake-up lock if the camera service process has completed the image processing service.

In an example of this application, the processor 910 is configured to:
send a camera disable message to the camera service process by using the camera application:
add the camera disable message to an image processing message queue by using the camera service process, where the image processing message queue is used to store an image processing message, and the image processing message includes data required when the camera service process generates an image:
query a status value of a target flag bit when only the camera disable message exists in the image processing message queue, where the target flag bit is used to indicate whether the camera service process has completed an image processing service; and
determine the image processing service status of the camera service process based on the status value of the target flag bit.

In an example of this application, an image processing module and an image processing management module are running in the camera service process: the processor 910 is configured to:
send a camera disable message to the image processing module in the camera service process by using the camera application:
receive the camera disable message by using the image processing module:
add the camera disable message to the image processing message queue by using the image processing module:
when only the camera disable message exists in the image processing message queue, trigger, by using the image processing module, the image management module to query the status value of the target flag bit; and
determine the image processing service status of the camera service process based on the status value of the target flag bit by using the image processing module.

In an example of this application, the processor 910 is configured to:
if the status value of the target flag bit is a first value, determine that the camera service process has completed the image processing service: or
if the status value of the target flag bit is a second value, determine that the camera service process does not complete the image processing service.

In an example of this application, the processor 910 is configured to:
start a timer by using the camera service process; and
the controlling the camera service process to release the wake-up lock if the camera service process has completed the image processing service includes:
if timing duration of the timer reaches a second duration threshold and/or the camera service process has completed the image processing service, controlling the camera service process to release the wake-up lock, where the second duration threshold is greater than or equal to target duration, and the target duration includes total duration in which the camera service process generates an image and completes callback of the image.

In an example of this application, the first duration threshold is greater than or equal to K and is less than 2K, K is the target duration, and the processor 910 is configured to:
after an image is generated by using the camera service process, call back the generated image; and
if an image processing message still exists in the image processing message queue, control the timer to restart timing.

In an example of this application, a condition for triggering the camera service process to release the wake-up lock is that the camera service process has completed the image processing service, and before the controlling the camera service process to release the wake-up lock, the processor 910 is further configured to:
if the camera service process has completed the image processing service, and the timing duration of the timer does not reach the second duration threshold, control the timer to cancel a timing operation.

In this embodiment of this application, a photographing operation is performed by using the camera application. If the camera application is disabled within a short time after the camera application performs photographing, to prevent the electronic device from entering the sleep mode, the camera service process is controlled to hold the wake-up lock, so that the operating system of the electronic device cannot enter the sleep mode by using the wake-up lock, thereby avoiding impact on execution of the image processing service by the camera application process, that is, the camera application process can still continue to execute the image processing service. Then, the image processing service status of the camera service process is determined. If the camera service process has completed the image processing service, in this case, the operating system may be allowed to enter the sleep mode. Therefore, the camera service process is controlled to release the wake-up lock, so that the operating system can normally enter the sleep mode.

In this way, after the camera application is disabled, the camera service process is controlled to obtain and release the wake-up lock, so that the operating system cannot enter the sleep state in a short time, thereby avoiding a problem that the camera service process cannot run normally, which causes an image loss.

It should be noted that, when the process control apparatus provided in the foregoing embodiment performs the process control method, division of the foregoing functional modules is merely used as an example for description. In actual application, the foregoing functions may be allocated to different functional modules for implementation based on a requirement, that is, an inner structure of the apparatus is divided into different functional modules to implement all or some of the functions described above.

Each functional unit or module in the embodiments may be integrated into one processing unit, or each unit may exist alone physically, or two or more units are integrated into one unit. The foregoing integrated unit may be implemented in a form of hardware, or may be implemented in a form of a software functional unit. In addition, specific names of the functional units or modules are merely for distinction, and are not intended to limit the protection scope of the embodiments of this application.

The process control apparatus provided in the foregoing embodiment belongs to a same concept as the process control method embodiment. For a specific working process and technical effect of the unit and the module in the foregoing embodiment, refer to the method embodiment. Details are not described herein again.

All or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a digital versatile disc (DVD)), a semi-conductive medium (for example, a solid state disk (SSD)), or the like.

The foregoing descriptions are merely optional embodiments of this application, but are not intended to limit this application. Any modification, equivalent replacement, or improvement made within the technical scope of this application shall fall within the protection scope of this application.

What is claimed is:

1. A process control method, applied to an electronic device, wherein the method comprises:

performing a photographing operation by using a camera application;

if the camera application is disabled within a first duration threshold after photographing, controlling a camera service process to hold a wake-up lock, wherein the camera service process is used to provide an image processing service, the image processing service generates and calls back a corresponding image after the camera application performs the photographing operation, and the wake-up lock is used to prevent an operating system of the electronic device from entering a sleep state;

querying a status value of a target flag bit when only a camera disable message exists in an image processing message queue, wherein the image processing message queue comprises data required when the camera service process generates an image, and wherein the target flag bit indicates whether the camera service process has completed an image processing service;

determining an image processing service status of the camera service process based on the status value of the target flag bit; and controlling the camera service process to release the wake-up lock if the camera service process has completed the image processing service.

2. The method according to claim 1, wherein before querying the status value of the target flag bit, the method further comprises:

sending a camera disable message to the camera service process by using the camera application; and adding the camera disable message to the image processing message queue by using the camera service process.

3. The method according to claim 2, wherein an image processing module and an image processing management module are running in the camera service process;

the sending a camera disable message to the camera service process by using the camera application comprises:

sending a camera disable message to the image processing module in the camera service process by using the camera application; and receiving the camera disable message by using the image processing module;

the adding the camera disable message to an image processing message queue by using the camera service process comprises:

adding the camera disable message to the image processing message queue by using the image processing module;

the querying a status value of a target flag bit when only the camera disable message exists in the image processing message queue comprises:

when only the camera disable message exists in the image processing message queue, triggering, by using the image processing module, the image processing management module to query the status value of the target flag bit; and the determining the image processing service status of the camera service process based on the status value of the target flag bit comprises:

determining the image processing service status of the camera service process based on the status value of the target flag bit by using the image processing module.

4. The method according to claim 2, wherein the determining the image processing service status of the camera service process based on the status value of the target flag bit comprises:
- if the status value of the target flag bit is a first value, determining that the camera service process has completed the image processing service; or
- if the status value of the target flag bit is a second value, determining that the camera service process does not complete the image processing service.

5. The method according to claim 2, wherein the method further comprises:
- starting a timer by using the camera service process; and
- the controlling the camera service process to release the wake-up lock if the camera service process has completed the image processing service comprises:
  - if timing duration of the timer reaches a second duration threshold and/or the camera service process has completed the image processing service, controlling the camera service process to release the wake-up lock, wherein the second duration threshold is greater than or equal to target duration, and the target duration comprises total duration in which the camera service process generates an image and completes callback of the image.

6. The method according to claim 5, wherein the first duration threshold is greater than or equal to K and is less than 2K, K is the target duration, and the method further comprises:
- after an image is generated by using the camera service process, calling back the generated image; and
- if an image processing message still exists in the image processing message queue, controlling the timer to restart timing.

7. The method according to claim 5, wherein a condition for triggering the camera service process to release the wake-up lock is that the camera service process has completed the image processing service, and before the controlling the camera service process to release the wake-up lock, the method further comprises:
- if the camera service process has completed the image processing service, and the timing duration of the timer does not reach the second duration threshold, controlling the timer to cancel a timing operation.

8. An electronic device, comprising a memory, a processor, and a computer program stored in the memory and capable of running on the processor, wherein when executing the computer program, the processor implements the following content:
- performing a photographing operation by using a camera application;
- if the camera application is disabled within a first duration threshold after photographing, controlling a camera service process to hold a wake-up lock, wherein the camera service process is used to provide an image processing service, the image processing service generates and calls back a corresponding image after the camera application performs the photographing operation, and the wake-up lock is used to prevent an operating system of the electronic device from entering a sleep state;
- querying a status value of a target flag bit when only a camera disable message exists in an image processing message queue, wherein the image processing message queue comprises data required when the camera service process generates an image, and wherein the target flag bit indicates whether the camera service process has completed an image processing service;
- determining an image processing service status of the camera service process based on the status value of the target flag bit; and
- controlling the camera service process to release the wake-up lock if the camera service process has completed the image processing service.

9. The electronic device according to claim 8, wherein the processor is configured to:
- before querying the status value of the target flag bit:
  - send a camera disable message to the camera service process by using the camera application; and
  - add the camera disable message to an image processing message queue by using the camera service process, wherein the image processing message queue is used to store an image processing message, and the image processing message comprises data required when the camera service process generates an image.

10. The electronic device according to claim 9, wherein the determining the image processing service status of the camera service process based on the status value of the target flag bit comprises:
- if the status value of the target flag bit is a first value, determining that the camera service process has completed the image processing service; or
- if the status value of the target flag bit is a second value, determining that the camera service process does not complete the image processing service.

11. The electronic device according to claim 8, wherein the processor is further configured to:
- start a timer by using the camera service process; and
- the controlling the camera service process to release the wake-up lock if the camera service process has completed the image processing service comprises:
  - if timing duration of the timer reaches a second duration threshold and/or the camera service process has completed the image processing service, controlling the camera service process to release the wake-up lock, wherein the second duration threshold is greater than or equal to target duration, and the target duration comprises total duration in which the camera service process generates an image and completes callback of the image.

12. The electronic device according to claim 11, wherein the first duration threshold is greater than or equal to K and is less than 2K, K is the target duration, and the processor further implements:
- after an image is generated by using the camera service process, calling back the generated image; and
- if an image processing message still exists in the image processing message queue, controlling the timer to restart timing.

13. The electronic device according to claim 11, wherein a condition for triggering the camera service process to release the wake-up lock is that the camera service process has completed the image processing service, and before the controlling the camera service process to release the wake-up lock, the processor further implements:
- if the camera service process has completed the image processing service, and the timing duration of the timer does not reach the second duration threshold, controlling the timer to cancel a timing operation.

14. A non-transitory computer-readable storage medium, wherein the computer-readable storage medium stores instructions, and when the instructions are run on a computer, the computer performs operations comprising:

performing a photographing operation by using a camera application;

if the camera application is disabled within a first duration threshold after photographing, controlling a camera service process to hold a wake-up lock, wherein the camera service process is used to provide an image processing service, the image processing service generates and calls back a corresponding image after the camera application performs the photographing operation, and the wake-up lock is used to prevent an operating system of an electronic device from entering a sleep state;

querying a status value of a target flag bit when only a camera disable message exists in an image processing message queue, wherein the image processing message queue comprises data required when the camera service process generates an image, and wherein the target flag bit indicates whether the camera service process has completed an image processing service;

determining an image processing service status of the camera service process based on the status value of the target flag bit; and controlling the camera service process to release the wake-up lock if the camera service process has completed the image processing service.

15. The non-transitory computer-readable storage medium according to claim 14, wherein before querying the status value of the target flag bit, the operations further comprise:

sending a camera disable message to the camera service process by using the camera application; and adding the camera disable message to the image processing message queue by using the camera service process.

16. The non-transitory computer-readable storage medium according to claim 15, wherein an image processing module and an image processing management module are running in the camera service process;

the sending a camera disable message to the camera service process by using the camera application comprises:

sending a camera disable message to the image processing module in the camera service process by using the camera application; and receiving the camera disable message by using the image processing module;

the adding the camera disable message to an image processing message queue by using the camera service process comprises:

adding the camera disable message to the image processing message queue by using the image processing module;

the querying a status value of a target flag bit when only the camera disable message exists in the image processing message queue comprises:

when only the camera disable message exists in the image processing message queue, triggering, by using the image processing module, the image processing management module to query the status value of the target flag bit; and the determining the image processing service status of the camera service process based on the status value of the target flag bit comprises:

determining the image processing service status of the camera service process based on the status value of the target flag bit by using the image processing module.

17. The non-transitory computer-readable storage medium according to claim 15, wherein the determining the image processing service status of the camera service process based on the status value of the target flag bit comprises:

if the status value of the target flag bit is a first value, determining that the camera service process has completed the image processing service; or if the status value of the target flag bit is a second value, determining that the camera service process does not complete the image processing service.

18. The non-transitory computer-readable storage medium according to claim 15, wherein the operations further comprise:

starting a timer by using the camera service process, and the controlling the camera service process to release the wake-up lock if the camera service process has completed the image processing service comprises:

if timing duration of the timer reaches a second duration threshold and/or the camera service process has completed the image processing service, controlling the camera service process to release the wake-up lock, wherein the second duration threshold is greater than or equal to target duration, and the target duration comprises total duration in which the camera service process generates an image and completes callback of the image.

19. The non-transitory computer-readable storage medium according to claim 18, wherein the first duration threshold is greater than or equal to K and is less than 2K, K is the target duration, and the operations further comprise:

after an image is generated by using the camera service process, calling back the generated image; and if an image processing message still exists in the image processing message queue, controlling the timer to restart timing.

20. The non-transitory computer-readable storage medium according to claim 18, wherein a condition for triggering the camera service process to release the wake-up lock is that the camera service process has completed the image processing service, and before the controlling the camera service process to release the wake-up lock, the operations further comprise:

if the camera service process has completed the image processing service, and the timing duration of the timer does not reach the second duration threshold, controlling the timer to cancel a timing operation.

* * * * *

UNITED STATES PATENT AND TRADEMARK OFFICE
CERTIFICATE OF CORRECTION

| | |
|---|---|
| PATENT NO. | : 12,389,110 B2 |
| APPLICATION NO. | : 18/262328 |
| DATED | : August 12, 2025 |
| INVENTOR(S) | : Jirun Xu |

Page 1 of 1

It is certified that error appears in the above-identified patent and that said Letters Patent is hereby corrected as shown below:

In the Claims

In Column 35, In Line 12, In Claim 14, delete "state:" and insert -- state; --.

In Column 36, In Line 23 (Approx.), In Claim 18, delete "wherein the operations further comprise:" and insert the same on Column 36, Line 22 (Approx.), as a continuation of the same line.

In Column 36, In Line 24 (Approx.), In Claim 18, delete "process," and insert -- process; --.

Signed and Sealed this
Fourteenth Day of October, 2025

John A. Squires
*Director of the United States Patent and Trademark Office*